US012626336B2

(12) United States Patent
Moon et al.

(10) Patent No.: US 12,626,336 B2
(45) Date of Patent: May 12, 2026

(54) APPARATUS AND METHOD FOR IMPROVING IMAGE QUALITY USING JAMES-STEIN COMBINATION EQUATION

(71) Applicant: GWANGJU INSTITUTE OF SCIENCE AND TECHNOLOGY, Gwangju (KR)

(72) Inventors: Bochang Moon, Gwangju (KR); Jeongmin Gu, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 293 days.

(21) Appl. No.: 18/376,891

(22) Filed: Oct. 5, 2023

(65) Prior Publication Data

US 2024/0135498 A1    Apr. 25, 2024
US 2024/0233085 A9    Jul. 11, 2024

(30) Foreign Application Priority Data

Oct. 19, 2022    (KR) ........................ 10-2022-0134714

(51) Int. Cl.
*G06T 5/50* (2006.01)
*G06T 5/70* (2024.01)

(52) U.S. Cl.
CPC .................. *G06T 5/50* (2013.01); *G06T 5/70* (2024.01); *G06T 2207/10024* (2013.01); *G06T 2207/20084* (2013.01); *G06T 2207/20212* (2013.01)

(58) Field of Classification Search
CPC ....... G06T 5/00–94; G06T 2207/10024; G06T 2207/20084; G06T 2207/20212
See application file for complete search history.

(56) References Cited

U.S. PATENT DOCUMENTS

| 2018/0130248 | A1* | 5/2018 | Mitchell | ................. | G06T 15/06 |
| 2019/0272623 | A1* | 9/2019 | Mack | ......................... | G06T 5/60 |
| 2021/0287780 | A1* | 9/2021 | Korani | .................... | G06N 3/045 |

(Continued)

OTHER PUBLICATIONS

Arthur Firmino, Jeppe Revall Frisvad, Henrik Wann Jensen "Progressive Denoising of Monte Carlo Rendered Images" May 24, 2022 Eurographics 2022 (Year: 2022).*

(Continued)

*Primary Examiner* — Sean T Motsinger
(74) *Attorney, Agent, or Firm* — Hauptman Ham, LLP

(57) ABSTRACT

The present disclosure relates to an apparatus and method for improving image quality by combining an unbiased image and a biased image using a James-Stein combiner. An apparatus for improving image quality using a James-Stein combiner according to the present disclosure includes an unbiased image buffer configured to output an unbiased image block, a biased image buffer configured to output a biased image block, a sample variance buffer configured to output a sample variance of the unbiased image, an artificial neural network model configured to derive a variance weight per pixel, a variance estimator configured to output a variance estimate of the unbiased image block, and a James-Stein combiner configured to locally combine the biased image block, the unbiased image block, and the variance estimate of the unbiased image block by applying a James-Stein combination equation.

20 Claims, 7 Drawing Sheets

(56)                    References Cited

U.S. PATENT DOCUMENTS

2024/0013525 A1 *    1/2024  Lim ........................ G06V 10/82
2024/0135498 A1 *    4/2024  Moon ....................... G06T 5/70

OTHER PUBLICATIONS

Jeongmin Gu, Jose A. Iglesias-Guitian, and Bochang Moon "Neural James-Stein Combiner for Unbiased and Biased Renderings" ACM Trans.Graph. 41, 6, Article 262 (Dec. 2022) . (Year: 2022).*

Bako et al, "Kernel-Predicting Convolutional Networks for Denoising Monte Carlo Renderings," ACM Transactions on Graphics, Jul. 2017, vol. 36, No. 4, article 97 (14 pages).

Yu et al., "Monte Carlo Denoising via Auxiliary Feature Guided Self-Attention," ACM Trans. Graph., Dec. 2021, vol. 40, No. 6, article 273 (13 pages).

James et al., "Estimation with Quadratic Loss," In Proc. 4th Berkeley Symp. Mathematical Statistics Probability, 1961, vol. 1, pp. 361-379.

Green et al., "A James-Stein Type Estimator for Combining Unbiased and Possibly biased Estimators," Journal of the American Statistical Association, Dec. 1991, vol. 86, No. 416, pp. 1001-1006.

* cited by examiner

FIG. 5

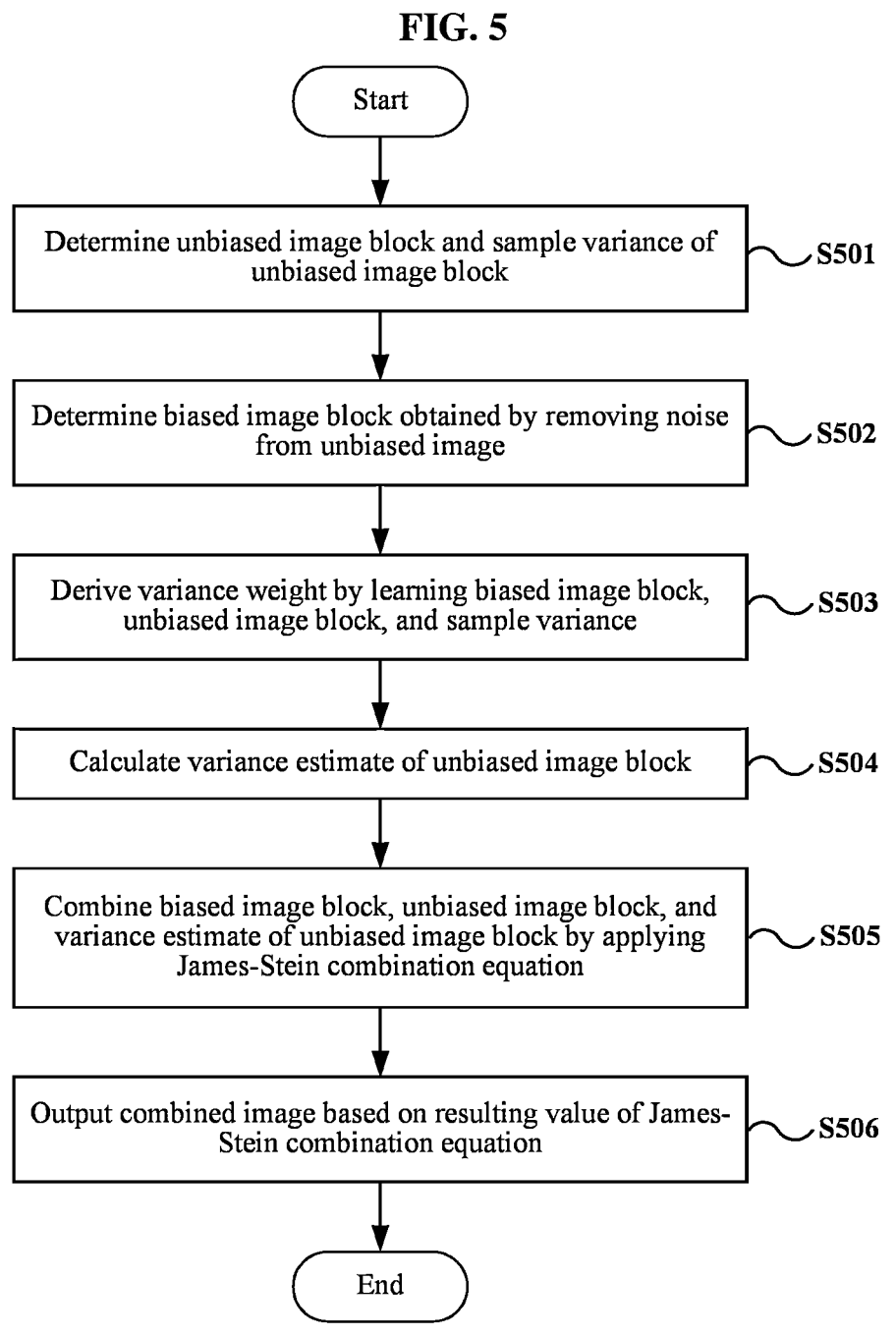

Start

Determine unbiased image block and sample variance of unbiased image block ⟲ S501

Determine biased image block obtained by removing noise from unbiased image ⟲ S502

Derive variance weight by learning biased image block, unbiased image block, and sample variance ⟲ S503

Calculate variance estimate of unbiased image block ⟲ S504

Combine biased image block, unbiased image block, and variance estimate of unbiased image block by applying James-Stein combination equation ⟲ S505

Output combined image based on resulting value of James-Stein combination equation ⟲ S506

End

FIG. 6

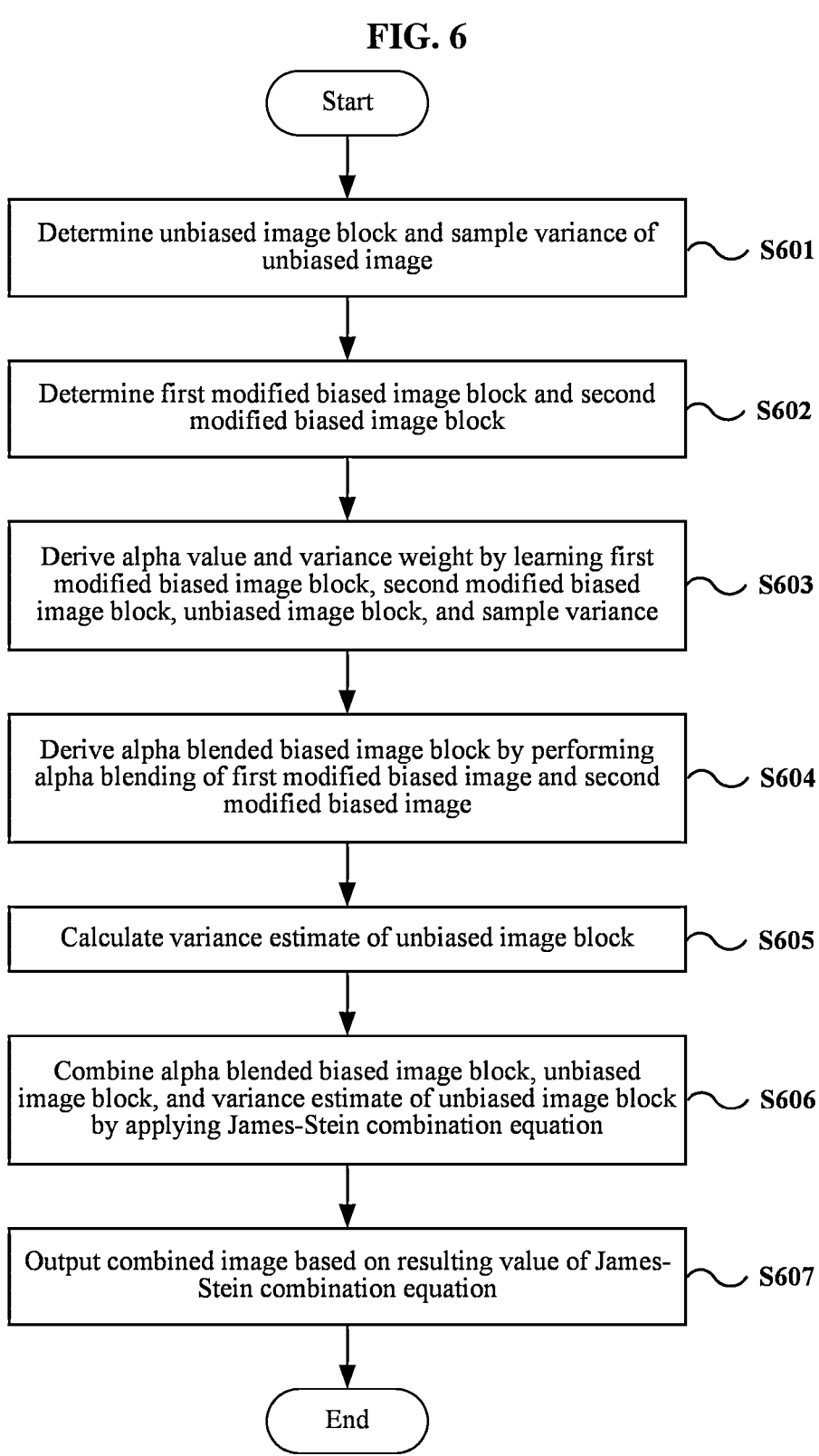

Start

Determine unbiased image block and sample variance of unbiased image     ∿ S601

Determine first modified biased image block and second modified biased image block     ∿ S602

Derive alpha value and variance weight by learning first modified biased image block, second modified biased image block, unbiased image block, and sample variance     ∿ S603

Derive alpha blended biased image block by performing alpha blending of first modified biased image and second modified biased image     ∿ S604

Calculate variance estimate of unbiased image block     ∿ S605

Combine alpha blended biased image block, unbiased image block, and variance estimate of unbiased image block by applying James-Stein combination equation     ∿ S606

Output combined image based on resulting value of James-Stein combination equation     ∿ S607

End

APPARATUS AND METHOD FOR IMPROVING IMAGE QUALITY USING JAMES-STEIN COMBINATION EQUATION

CROSS-REFERENCE TO RELATED APPLICATION

This application claims the benefit of Korean Patent Application No. 10-2022-0134714 filed on Oct. 19, 2022, in the Korean Intellectual Property Office, the entire disclosure of which is incorporated herein by reference for all purposes.

BACKGROUND

1. Field of the Invention

The present disclosure relates to an apparatus and method for improving image quality, and more particularly, to an apparatus and method for improving image quality by combining an unbiased image and a biased image using a James-Stein combiner.

2. Description of the Related Art

As a method for generating an image through photorealistic rendering, a Monte Carlo rendering method is widely known. Monte Carlo rendering is a widely used method for rendering photo-like images in games and film productions, and in order to obtain high-quality images during the rendering process, the number of samples per pixel (spp) must be increased, which leads to an increase in rendering time.

FIG. 1 is a diagram comparing qualities of images resulting from traditional Monte Carlo rendering according to the number of samples, wherein (a) is a rendering result using 2,000 (2 k) samples per pixel, and (b) is a rendering result using 64,000 (64 k) samples per pixel. When using 2,000 samples per pixel, it has a lot of noise in the rendering result.

Since Monte Carlo rendering method such as path tracing is an unbiased rendering method and may reach the ground truth when an infinite number of samples are used per pixel, noise (Monte Carlo variance) is included when the number of samples is finite. In addition, since a large number of samples are required to obtain high-quality image, a lot of time is required to generate a noisy-free image.

Accordingly, various methods of rendering an image including noise using a Monte Carlo rendering method using a limited number of samples and then removing noise through deep learning have been attempted.

As a conventional technique for removing noise included in a Monte Carlo rendeing image using a deep learning method, Bako and other researchers proposed kernel predicting convolution networks (KPCN) that infer weights per pixel of a general denoising kernel (Non-Patent Document 1). Yu and other researchers have proposed an auxiliary feature guided self-attention (AFGSA) technology that effectively removes Monte Carlo rendering noise using the transformer-based network, an advanced neural framework (Non-Patent Document 2).

FIG. 2 is a graph illustrating the number of samples per pixel (spp) and noise removal effect of existing noise removing techniques of a Monte Carlo rendering image, wherein (a) is a graph for a curly-hair image, and (b) is a graph for a veach-ajar image, and (c) is a graph for a glass-of-water image.

For each image, the relative error (relative L2 error) compared with the ground truth image was shown while removing the noise of the Monte Carlo rendering image by the path tracing (PT) method, the KPCN method based on Non-Patent Document 1, and the AFGSA method based on Non-Patent Document 2.

For all images (see (a), (b), (c) of FIG. 2), the PT method linearly decreases the relative error as the number of samples per pixel increases. As such, the PT method is a consistent estimation method, but the result value may be limited by certain parameters.

On the other hand, in the case of a curly hair image (see (a) of FIG. 2) or a glass-of-water image (see (c) of FIG. 2), as the number of samples per pixel (spp) increases, the relative error of the KPCN method and the AFGSA method becomes larger than that of the PT method. In the case of a veach-ajar image (see (b) of FIG. 2), in the KPCN method and the AFGSA method, the error reduction effect decreases even when the number of samples per pixel (spp) increases. In all images, the KPCN method and the AFGSA method are inconsistent in their error reduction effect versus the number of samples per pixel.

In summary, the conventional deep learning-based denoisers for Monte Carlo rendering have problems in that consistency cannot be guaranteed, such as an increase in relative error compared to the PT method or a decrease in the error reduction effect, even if the number of samples per pixel is increased.

PRIOR ART DOCUMENT

Non-Patent Document (Non-Patent Document 0001) Document 1: Steve Bako, Thijs Vogels, Brian McWilliams, Mark Meyer, Jan Novak, Alex Harvill, Pradeep Sen, Tony Derose, and Fabrice Rousselle. 2017. Kernel-predicting convolutional networks for denoising Monte Carlo renderings. ACM Trans. Graph. 36, 4(2017), 14 pages (Non-Patent Document 0002) Document 2: Jiaqi Yu, Yongwei Nie, Chengjiang Long, Wenju Xu, Qing Zhang, and Guiqing Li. 2021. Monte Carlo Denoising via Auxiliary Feature Guided Self-Attention. ACM Trans. Graph. 40, 6 (2021), 13 pages.

(Non-Patent Document 0003) Document 3: Charles Stein and Willard James. 1961. Estimation with quadratic loss. In Proc. $4^{th}$ Berkeley Symp. Mathematical Statistics Probability, Vol. 1. 361-379.

(Non-Patent Document 0004) Document 4: Edwin J Green and William E Strawderman. 1991. A James-Stein type estimator for combining unbiased and possibly biased estimators. J. Amer. Statist. Assoc. 86, 416 (1991), 1001-1006.

SUMMARY

An object of the present disclosure is to provide an apparatus and method for improving image quality capable of estimating a ground truth image by combining a pair of biased image and unbiased image with a James-Stein combiner.

The present disclosure may be implemented in a variety of ways, including an apparatus (system), a method, a computer program stored in a non-transitory computer readable medium, or a non-transitory computer readable medium in which a computer program is stored.

According to an aspect of the present disclosure, there is provided an apparatus for improving image quality using a James-Stein combiner including: an unbiased image buffer configured to output an unbiased image block centered on combination pixel c in an unbiased image; a biased image buffer configured to output a biased image block centered on combination pixel c in a biased image obtained by removing noise from the unbiased image; a sample variance buffer configured to output a sample variance of the unbiased image; an artificial neural network model configured to derive a variance weight per pixel by learning the biased image block, the unbiased image block, and the sample variance; a variance estimator configured to output a variance estimate of the unbiased image block based on the variance weight per pixel; and a James-Stein combiner configured to locally combine the biased image block, the unbiased image block, and the variance estimate of the unbiased image block by applying a James-Stein combination equation, wherein an error of an image combined in the James-Stein combiner is smaller than an error of the unbiased image.

According to another aspect of the present disclosure, there is provided an apparatus for improving image quality using a James-Stein combiner including: an unbiased image buffer configured to output an unbiased image block centered on combination pixel c in an unbiased image; a biased image buffer configured to output a first modified biased image block and a second modified biased image block centered on combination pixel c, respectively, in a first modified biased image and a second modified biased image modified to remove noise from two mutually independent unbiased images and to include image feature information, respectively; a sample variance buffer configured to output a sample variance of the unbiased image; an artificial neural network model configured to derive an alpha value and a variance weight per pixel by learning the first modified biased image block, the second modified biased image block, the unbiased image block, and the sample variance; a variance estimator configured to output a variance estimate of the unbiased image block based on the variance weight per pixel; an alpha blender configured to derive an alpha blended biased image block in which the first modified biased image block and the second modified biased image block are combined by performing alpha blending based on the first modified biased image block, the second modified biased image block, and the alpha value; and a James-Stein combiner configured to locally combine the alpha blended biased image block, the unbiased image block, and the variance estimate of the unbiased image block by applying a James-Stein combination equation, wherein an error of an image combined in the James-Stein combiner is smaller than an error of the unbiased image.

Preferably, the alpha blender is configured to perform alpha blending by applying the first modified biased image block $$(\hat{y}_i^A),$$

the second modified biased image block $$(\hat{y}_i^B),$$

and the alpha value ($\alpha_i$) to Equation 8.

Preferably, the first modified biased image is derived by reflecting image features derived as a second feature set to the first biased image, and the second modified biased image is derived by reflecting image features derived as a first feature set to the second biased image, and the first feature set includes rendering-related image features of the first biased image, and the second feature set includes rendering-related image features of the second biased image.

Preferably, of the two mutually independent unbiased images, one unbiased image includes an average of the first half samples, and the other unbiased image includes an average of the second half samples.

Preferably, the apparatus for improving image quality using the James-Stein combiner includes a combined image generator to output a combined image based on a resulting value of the James-Stein combination equation.

More preferably, the combined image generator is configured to average resulting values of the James-Stein combination equation derived for all pixels c belonging to an image block $\Omega_i$ of any pixel i to estimate it as a color value of the pixel i.

Preferably, the unbiased image is a rendering image by a path tracing method.

Preferably, the biased image is an image obtained by removing noise from the unbiased image by a kernel predicting convolution network (KPCN) method.

Preferably, the biased image is an image obtained by removing noise from the unbiased image by an auxiliary feature guided self-attention (AFGSA) method.

Preferably, the artificial neural network model is implemented as U-Net.

According to another aspect of the present disclosure, there is provided a method of improving image quality using a James-Stein combiner implemented by at least one processor of a computer system including: determining, by the computer system, an unbiased image block centered on combination pixel c in an unbiased image and a sample variance of the unbiased image block; determining, by the computer system, a biased image block centered on combination pixel c in a biased image obtained by removing noise from the unbiased image; deriving, by the computer system, a variance weight per pixel by learning the biased image block, the unbiased image block, and the sample variance in an artificial neural network model; calculating, by the computer system, a variance estimate of the unbiased image block based on the variance weight per pixel; and locally combining, by the computer system, the biased image block, the unbiased image block, and the variance estimate of the unbiased image block by applying a James-Stein combination equation, wherein an error of an image combined by the James-Stein combination equation is smaller than an error of the unbiased image.

According to another aspect of the present disclosure, there is provided a method of improving image quality using a James-Stein combiner implemented by at least one processor of a computer system including: determining, by the computer system, an unbiased image block centered on combination pixel c in an unbiased image and a sample variance of the unbiased image block; determining, by the computer system, a first modified biased image block and a second modified biased image block centered on combination pixel c, respectively, in a first modified biased image and a second modified biased image modified to remove noise from two mutually independent unbiased images and to include image feature information, respectively; deriving, by the computer system, an alpha value and a variance weight per pixel by learning the first modified biased image block, the second modified biased image block, the unbiased image block, and the sample variance with an artificial neural network model; calculating, by the computer system, a variance estimate of the unbiased image block based on the variance weight per pixel; deriving, by the computer system, an alpha blended biased image block in which the first modified biased image block and the second modified biased image block are combined by performing alpha blending based on the first modified biased image block, the second modified biased image block, and the alpha value; and locally combining, by the computer system, the alpha blended biased image block, the unbiased image block, and the variance estimate of the unbiased image block by applying a James-Stein combination equation, wherein an error of an image combined by the James-Stein combination equation is smaller than an error of the unbiased image.

Preferably, the computer system is configured to perform alpha blending by applying the first modified biased image block $$(\hat{y}_i^A),$$

the second modified biased image block $$(\hat{y}_i^B),$$

and the alpha value $(\alpha_i)$ to Equation 8.

Preferably, the first modified biased image is derived by reflecting image features derived as a second feature set to the first biased image, and the second modified biased image is derived by reflecting image features derived as a first feature set to the second biased image, and the first feature set includes rendering-related image features of the first biased image, and the second feature set includes rendering-related image features of the second biased image.

Preferably, of the two mutually independent unbiased images, one unbiased image includes an average of the first half samples, and the other unbiased image includes an average of the second half samples.

Preferably, the method further includes outputting, by the computer system, a combined image based on a resulting value of the James-Stein combination equation.

More preferably, the outputting of the combined image based on the resulting value of the James-Stein combination equation by the computer system includes averaging resulting values of the James-Stein combination equation derived for all pixels c belonging to an image block $\Omega_i$ of any pixel i to estimate it as a color value of the pixel i.

Preferably, the unbiased image is a rendering image by a path tracing method.

Preferably, the biased image is an image obtained by removing noise from the unbiased image by a kernel predicting convolution network (KPCN) method.

Preferably, the biased image is an image obtained by removing noise from the unbiased image by an auxiliary feature guided self-attention (AFGSA) method.

Preferably, the artificial neural network model is implemented as U-Net.

According to example embodiments of the present disclosure, it is possible to improve image quality by combining an unbiased image from path tracing with a biased image from a learning-based denoiser using a James-Stein combiner.

According to example embodiments of the present disclosure, it is possible to improve the image quality by combining the unbiased image and the biased image with the James-Stein combiner so that error of the combined image according to example embodiments is always equal to or smaller than the error of the unbiased image.

According to example embodiments of the present disclosure, since the unbiased rendering method and the biased rendering method are combined, it is possible to improve the image quality of the noise remover and the consistency of the resulting image.

Effects of example embodiments of the present disclosure are not limited to the effects mentioned above, and other effects that are not mentioned will be clearly understood by a person having ordinary skills in the technical field to which the present disclosure pertains (referred to as "a person skilled in the art") from the description of the claims.

BRIEF DESCRIPTION OF THE DRAWINGS

Example embodiments of the present disclosure will be described with reference to the accompanying drawings in which like reference numbers indicate like elements, but are not limited thereto.

FIG. 5 is an operational flowchart illustrating a method of improving image quality using a James-Stein combiner according to a first example embodiment of the present disclosure.

FIG. 6 is an operational flowchart illustrating a method of improving image quality using a James-Stein combiner according to a second example embodiment of the present disclosure.

DETAILED DESCRIPTION

Figure 1:
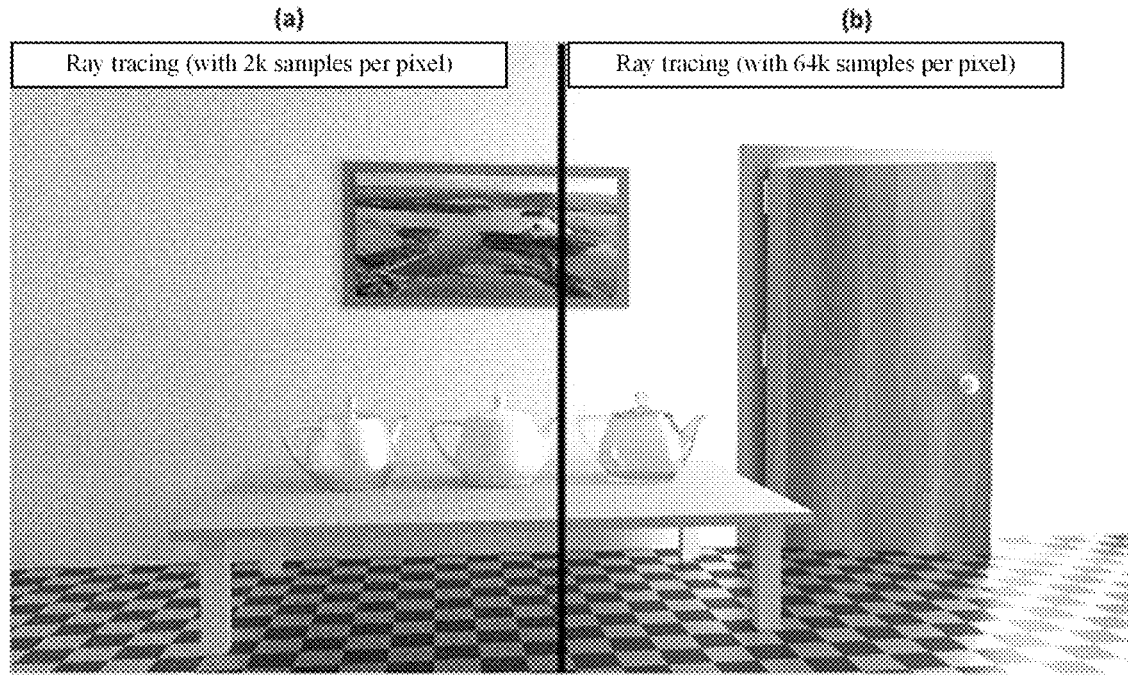
FIG. 1 is a diagram comparing qualities of images resulting from traditional Monte Carlo rendering according to the number of samples, wherein (a) is a rendering result image using 2,000 (2 k) samples per pixel, and (b) is a rendering result image using 64,000 (64 k) samples per pixel.
Figure 2:
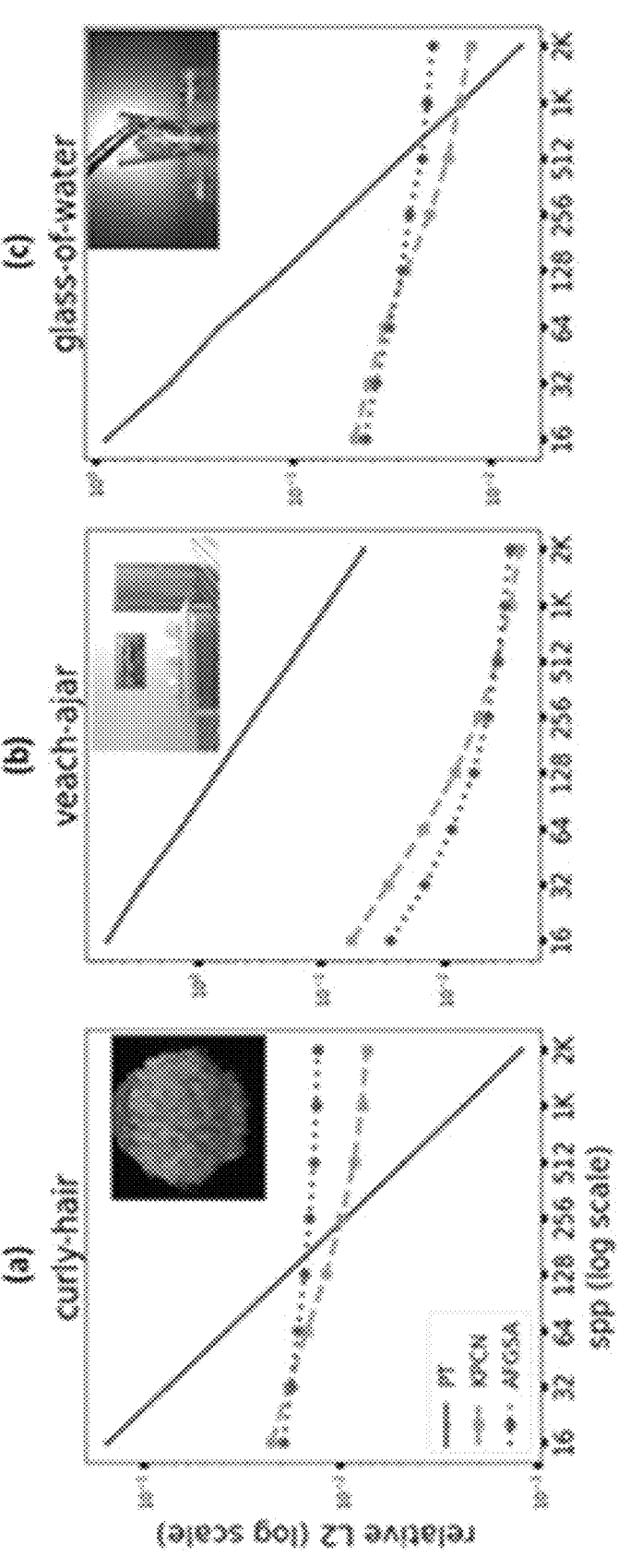
FIG. 2 is a graph illustrating the number of samples per pixel (spp) and noise removal effect of existing noise removing techniques of a Monte Carlo rendering image, wherein (a) is a graph for a curly-hair image, and (b) is a graph for a veach-ajar image, and (c) is a graph for a glass-of-water image.

Hereinafter, example embodiments for implementation of the present disclosure will be described in detail with reference to the accompanying drawings. However, in the following description, if there is a risk of unnecessarily obscuring the gist of the present disclosure, a specific description of a well-known function or configuration will be omitted.

In the accompanying drawings, like reference numerals refer to like components. In addition, in the description of the following example embodiments, redundant description of the same or corresponding components may be omitted. However, even if the description of the component is omitted, it is not intended that such a component is not included in any embodiment.

Advantages and features of embodiments disclosed herein, and methods for achieving them, will be clarified with reference to the example embodiments described below with the accompanying drawings. However, the present disclosure is not limited to the example embodiments disclosed below, but may be implemented in various different forms, and the example embodiments are provided merely to fully inform a person skilled in the art of the scope of the invention related to the present disclosure.

Unless otherwise defined, all terms (including technical and scientific terms) used herein may be used as the same meanings as those generally understood by a person skilled in the art to which the present disclosure pertains. In addition, terms defined in dictionaries generally used are not to be construed as an ideal or excessively formal meaning unless otherwise defined herein.

For example, the term "technology" may refer to a system, method, computer-readable instruction, module, algorithm, hardware logic, and/or operation permitted by the context described above throughout the specification.

Terms used herein will be briefly described, and disclosed example embodiments will be described in detail. The terms used herein have been selected from general terms that are currently widely used as much as possible while considering the functions in the present disclosure, but they may vary according to the intention of a person skilled in the art, a precedent, or emergence of new technologies. In addition, in certain cases, some terms are arbitrarily selected by the applicant, and in this case, their meanings will be described in detail in the description of the invention. Therefore, the term used in the present disclosure should be defined based on the meaning of the term and the overall content of the present disclosure, not just the name of the term.

In the specification, singular expressions are intended to include plural expressions, unless the context clearly indicates otherwise. In addition, plural expressions include singular expressions, unless the context clearly indicates otherwise. When it is described that a part comprises a component in the entire specification, this means that the part may further include other components without excluding other components, unless specifically stated to the contrary.

In the present disclosure, the terms such as "comprise" and/or "comprising" specify the presence of stated features, steps, operations, elements and/or components, but do not preclude the addition of one or more other features, steps, operations, elements, components, and/or combinations thereof.

In the present disclosure, when it is mentioned that one component is "coupled", "combined", "connected" or "associated" with or "reacts" to another component, the component may be directly coupled, combined, connected or associated with and/or react to the other component, but is not limited thereto. For example, there may be one or more intermediate components between the component and the other component. In addition, in the present disclosure, the term "and/or" may include each of one or more items listed or a combination of at least a portion of one or more items.

In the present disclosure, terms such as "first" and "second" are used to distinguish one component from another component, and the components are not limited by the terms. For example, a "first" component may be used to refer to an element of the same or similar form as a "second" component.

Artificial intelligence (AI) refers to the field of studying artificial intelligence or methodologies that can create it, and machine learning refers to the field of researching methodologies that define and solve various issues in the field of artificial intelligence. Machine learning is also defined as an algorithm that improves the performance of a task through continuous experience with that task.

An artificial neural network (ANN) is a model used in machine learning and may refer to an overall model with problem-solving capabilities composed of artificial neurons (nodes) formed by combining synapses. The artificial neural network may be defined by a connection pattern between neurons of different layers, a training process that updates training parameters in the model, and an activation function that generates output values.

The artificial neural network may include an input layer, an output layer, and optionally one or more hidden layers. Each layer may include one or more neurons, and the artificial neural network may include synapses connecting the neurons. In the artificial neural network, each neuron may output a function value of an activation function for input signals input through a synapse, a weight of each layer, and bias.

The training parameters of the model refer to parameters determined through training, and include the weights of synaptic connections and the bias of neurons. In addition, hyperparameters refer to parameters that should be set before training in a machine learning algorithm, and include a learning rate, a number of iterations, a mini-batch size, and an initialization function.

The purpose of training the artificial neural network may be to determine training parameters that minimize a loss function. The loss function may be used as an index to determine the optimal training parameters in the training process of the artificial neural network.

Machine learning may be classified into supervised learning, unsupervised learning, and reinforcement learning according to training methods.

Supervised learning refers to a method of training an artificial neural network with a label for training data, and the label may mean a correct answer (or a result value) that the artificial neural network should infer when the training data is input to the artificial neural network. Unsupervised learning may refer to a method of training an artificial neural network without being given a label for the training data. Reinforcement learning may refer to a training method in which an agent defined in an environment is trained to select an action or a sequence of actions that maximizes cumulative rewards in each state.

Machine learning, which is implemented as a deep neural network (DNN) containing a plurality of hidden layers among artificial neural networks, is also referred to as deep learning, and deep learning is part of machine learning. Hereinafter, the term "machine learning" is used to include deep learning. The artificial intelligence may be performed by an artificial neural network module.

Prior to describing the present disclosure, a James-Stein combiner will be described with reference to Non-Patent Document 3 and Non-Patent Document 4.

In Non-Patent Document 3, James and Stein presented a James-Stein estimation equation of Equation 1 below.

US 12,626,336 B2

9

$$\delta(X, Y) = Y + \left(1 - \frac{(p-2)\sigma^2}{\|X - Y\|^2}\right)(X - Y) \qquad \text{(Equation 1)}$$

Here, X is an unbiased estimate of size p (p≥3) and is a p-dimensional random vector following a normal distribution with a mean of Θ and a variance of σ². The statistical model of X may be expressed as "X~N(Θ, Iσ²)". Y is a specific point or vector (X and Y are independent), and in Non-Patent Document 3, a 0 vector of p size is used. Θ is an estimated ground truth image. I is an identity matrix of size p×p, and Iσ² assumes that all elements of X have the same variance in I (homogeneous variance assumption).

In Non-Patent Document 4, in the James-Stein estimation equation, a biased estimate is used for Y without using a 0 vector. In this case, the James-Stein estimation equation of Equation 1 may be interpreted as a combiner of the unbiased estimate X and the biased estimate Y. The present disclosure proposes a technique of combining an unbiased image and a biased image using the James-Stein combiner proposed in Non-Patent Document 4.

The James-Stein estimation equation of Equation 1 assumes that the unbiased image has a homogeneous variance. However, since unbiased images generally have heterogeneous variance, in the present disclosure, it is assumed that an unbiased image is divided into image blocks of a certain size and each image block has a homogeneous distribution, and the James-Stein combiner locally fuses the unbiased image and the biased image in image block units.

Figure 3:
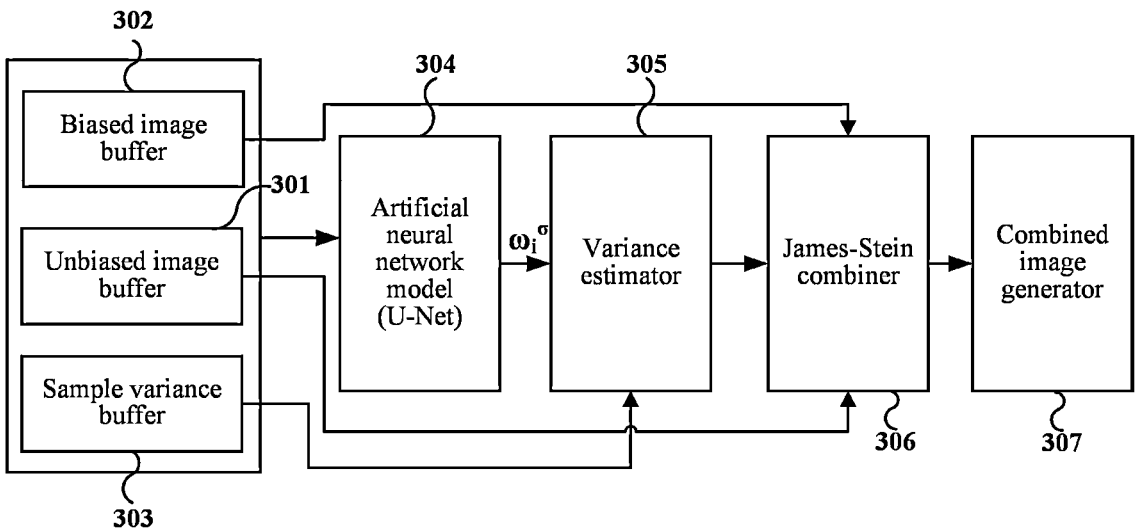
FIG. 3 is a configuration diagram illustrating an apparatus for improving image quality using a James-Stein combiner according to a first example embodiment of the present disclosure.

FIG. 3 is a configuration diagram illustrating an apparatus for improving image quality using a James-Stein combiner according to a first example embodiment of the present disclosure. The apparatus for improving image quality using the James-Stein combiner of the present disclosure may be implemented in a conventional computer system.

An apparatus for improving image quality using a James-Stein combiner according to the first example embodiment of the present disclosure includes an unbiased image buffer 301 configured to output an unbiased image block centered on combination pixel c in an unbiased image, a biased image buffer 302 configured to output a biased image block centered on combination pixel c in a biased image obtained by removing noise from the unbiased image, a sample variance buffer 303 configured to output a sample variance of the unbiased image, an artificial neural network model 304 configured to derive a variance weight per pixel by learning the biased image block, the unbiased image block, and the sample variance, a variance estimator 305 configured to output a variance estimate of the unbiased image block based on the variance weight per pixel, a James-Stein combiner 306 configured to combine the biased image block, the unbiased image block, and the variance estimate of the unbiased image block by applying a James-Stein combination equation, and a combined image generator 307 configured to output a combined image based on a resulting value of the James-Stein combination equation.

The unbiased image stored in the unbiased image buffer 301 may be a rendering image based on the path tracing method, in particular, a rendering image based on the Monte Carlo path tracing method.

The biased image stored in the biased image buffer 302 is a rendering image in which noise is removed from the unbiased image based on learning, which may be an image in which noise is removed from the unbiased image by the KPCN method described in Non-Patent Document 1 or an image in which noise is removed by the AFGSA method described in Non-Patent Document 2.

In the present disclosure, for the unbiased image and the biased image, each image block centered on the same combination pixel c is extracted (local homogeneous distribution assumption), and the extracted local image blocks are combined by applying the James-Stein combination equation. At this time, the image block centered on the combination pixel c is denoted as $\Omega_c$, and the size of this image block may be set to 15×15 pixels. $X_c$ refers to an unbiased image block centered on the combination pixel c, $\Theta_c$ refers to a biased image block centered on the combination pixel c, and $\Theta_c$ refers to a ground truth image block centered on the combination pixel c.

Statistical models of the unbiased image block $X_c$ and the biased image block $Y_c$ may be defined as in Equation 2.

$$X_c \sim N(\Theta_c, I\sigma_c^2) \qquad \text{(Equation 2)}$$
$$Y_c \sim N(\Theta_c + \Lambda_c, I\xi_c^2)$$

Here, $\Theta_c$ is a vectorized ground truth image block centered on the combination pixel c, $\Lambda_c$ is a bias value, I is an identity matrix of size p×p, $I\sigma_c^2$ is a variance of the unbiased image block $X_c$, and $I\xi_c^2$ is a variance of the biased image block $Y_c$. It is assumed that the unbiased image block and the biased image block have the same variance value at I.

For the combination pixel c, applying the unbiased image block $X_c$ and the biased image block Ye to the James-Stein estimation equation in Equation 1 gives Equation 3 below. The James-Stein combiner 306 may locally combine the unbiased image block $X_c$ and the biased image block $Y_c$ centered on the combination pixel c using Equation 3 below.

$$\delta(Xc, Yc) = Yc + \left(1 - \frac{(p-2)\delta_c^2}{\|Xc - Yc\|^2}\right)(Xc - Yc) \qquad \text{(Equation 3)}$$

The James-Stein combination equation $\delta(X_c, Y_c)$ in Equation 3 generates an estimate $\hat{\Theta}_c$ of an unknown ground truth image block $\Theta_c$. Since the variance $\sigma_c^2$ of the image block of the combination pixel c in Equation 3 above is an unknown value, it needs to be estimated. The variance estimator 305 of the present disclosure may locally weight average the sample variance of the unbiased image block to obtain the estimate $$\hat{\sigma}_c^2$$

of variance $$\sigma_c^2$$

as shown in Equation 4, and to this end, the sample variance of the unbiased image is provided to the variance estimator 305 from the sample variance buffer 303.

$$\hat{\sigma}_c^2 = \frac{1}{\sum_{i \in \Omega_c} \omega_i^\sigma} \sum_{i \in \Omega_c} \omega_i^\sigma s_i^2 \qquad \text{(Equation 4)}$$

Here, $\omega_i^{\sigma}$ is a positive variance weight assigned to the $i^{th}$ sample variance $s_i^2$, belonging to the image block $\Omega_c$ of combination pixel c, and the variance weight $\omega_i^{\sigma}$ per pixel of the image block $\Omega_c$ may be trained and inferred through supervised learning in the artificial neural network model 304.

The normalized positive variance weight ensures that the estimated variance is between the maximum and minimum values of the input variance $s_i^2$, which is inversely proportional to the sample size. The normalized positive variance weight may cause the estimated variance to decrease as the sample size increases.

For an image block $\Omega_i$ of any pixel i, the combined image generator 307 averages the resulting values of the James-Stein combination equation of Equation 3 derived for all pixels c belonging to the image block to estimate it as a color value of the pixel i, which is expressed as Equation 5.

$$\hat{\theta}_i = \frac{1}{|\Omega_i|}\sum_{c\in\Omega_i}\delta_i(X_c, Y_c) \qquad \text{(Equation 5)}$$

Here, $\hat{\theta}$ is the estimate of the color value of pixel i, $\Omega_i$ is the image block centered on pixel i, and $\delta_i(X_c, Y_c)$ is the resulting value of the James-Stein combination equation of Equation 3 of the pixel c belonging to the image block $\Omega_i$.

Figure 4:
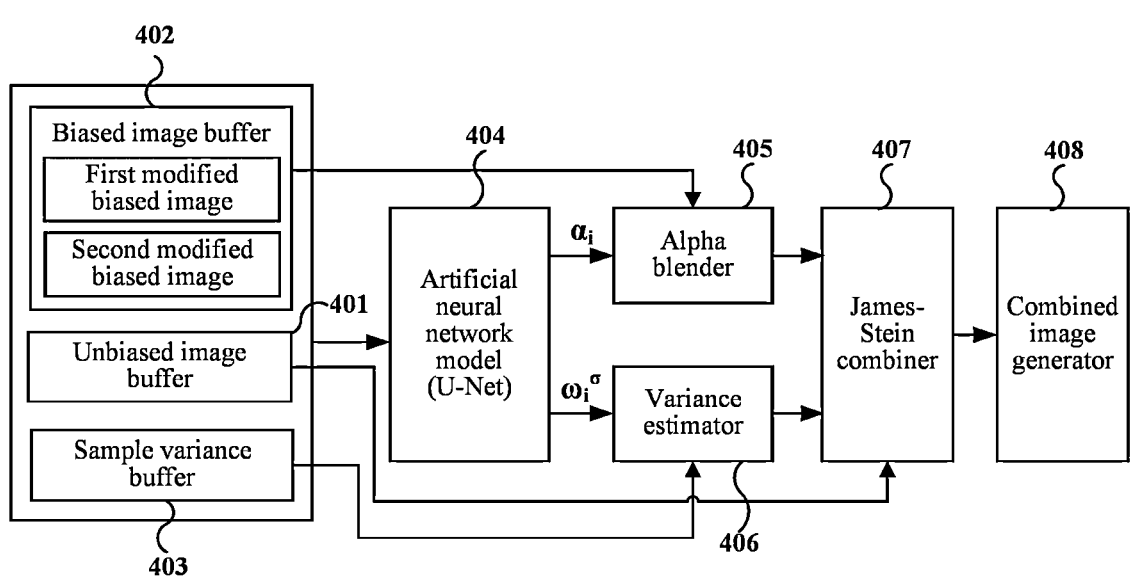
FIG. 4 is a configuration diagram illustrating an apparatus for improving image quality using a James-Stein combiner according to a second example embodiment of the present disclosure.

FIG. 4 is a configuration diagram illustrating an apparatus for improving image quality using a James-Stein combiner according to a second example embodiment of the present disclosure. The apparatus for improving image quality using the James-Stein combiner of the present disclosure can be implemented in a conventional computer system. In the second example embodiment, when the biased image Y has a much lower error than the unbiased image X, an optimization scheme capable of further reducing the error of the combined result image is proposed.

The apparatus for improving image quality using the James-Stein combiner according to the second example embodiment modifies the biased image Y to include image feature information using a regression-based approach, and then combines the modified biased image Y* and the unbiased image X with the James-Stein combiner.

An apparatus for improving image quality using a James-Stein combiner according to the second example embodiment of the present disclosure includes an unbiased image buffer 401 configured to output an unbiased image block centered on combination pixel c in an unbiased image, a biased image buffer 402 configured to output a first modified biased image block and a second modified biased image block centered on combination pixel c in a first modified biased image and a second modified biased image modified to remove noise from a first unbiased image and a second unbiased image mutually independent and to include image feature information, respectively; a sample variance buffer 403 configured to output a sample variance of the unbiased image; an artificial neural network model 404 configured to derive an alpha value and a variance weight per pixel by learning the first modified biased image block, the second modified biased image block, the unbiased image block, and the sample variance; an alpha blender 405 configured to combine the first modified biased image block and the second modified biased image block by performing alpha blending based on the first modified biased image block, the second modified biased image block, and the alpha value output from the artificial neural network model 404; a variance estimator 406 configured to output a variance estimate of the unbiased image block based on the variance weight per pixel; a James-Stein combiner 407 configured to combine the biased image block alpha blended in the alpha blender 405, the unbiased image block, and the variance estimate of the unbiased image block by applying a James-Stein combination equation, and a combined image generator 408 configured to output a combined image based on a resulting value of the James-Stein combination equation.

The unbiased image stored in the unbiased image buffer 401 may be a rendering image based on the path tracing method, in particular, a rendering image based on the Monte Carlo path tracing method.

The first modified biased image and the second modified biased image stored in the biased image buffer 402 are images modified to remove noise from mutually independent first unbiased image and second unbiased image, and to include image feature information.

Hereinafter, the process of deriving the first modified biased image and a second modified biased image will be described.

The first unbiased image and the second unbiased image are independent of each other, and may be denoted as $X^A$ and $X^B$. The first unbiased image $X^A$ may include the average of the first half samples, and the second unbiased image $X^B$ may include the average of the second half samples.

The first biased image $Y^A$ is a rendering image obtained by removing noise from the first unbiased image $X^A$ based on learning, the second biased image $Y^B$ is a rendering image obtained by removing noise from the second unbiased image $X^B$ based on learning. As a method of removing noise from the unbiased image, the KPCN method described in Non-Patent Document 1 or the AFGSA method described in Non-Patent Document 2 may be used. A set including the first biased image $Y^A$ and image features (albedo, normal, depth, and visibility) related to the rendering of the first biased image $Y^A$ is referred to as a first feature set $f^A$, and a set including the second biased image $Y^B$ and image features (albedo, normal, depth, and visibility) related to the rendering of the second biased image $Y^B$ is referred to as a second feature set $f^B$.

The first modified biased image $$\hat{y}_i^A$$

may be obtained by reflecting image features derived from the second feature set f B on the first biased image, and the second biased image $$\hat{y}_i^B$$

may be obtained by reflecting image features derived from the first feature set f A on the second biased image.

The first modified biased image $$\hat{y}_i^A$$

is as shown in Equation 6.

$$\hat{y}_i^A = \frac{1}{w_i}\sum_{c\in\Omega_i}\left(\hat{\beta}_c^A\left[\begin{array}{c}1\\f_i^B - f_c^B\end{array}\right]^T\right)\exp\left(\frac{-\|y_i^B - y_c^B\|}{2\kappa + \epsilon}\right) \qquad \text{(Equation 6)}$$

Here, $W_i$ is a normalization term, $W_i = \Sigma_{c \in \Omega_i} \exp(\cdot)$.

$$\hat{\beta}_c^A$$

is a linear model inferred based on a crossed half-buffer pair, i.e., the first unbiased image $X^A$ and the second feature set $f^B$, which may be calculated as least squares optimization. $f_i^B$ and $f_c^B$ are image feature vectors for each pixel in pixels i and c. $\kappa$ is the bandwidth term controlling the weight $\exp(\cdot)$ assigned to pixel i, and $\square = 0.01$. The lowercase symbols $y_i^B$ and $y_c^B$ are color values of pixels i and c of the second biased image $Y^B$.

The derivation equation of the linear model $$\hat{\beta}_c^A$$

in Equation 6 is the shown in Equation 7.

$$\hat{\beta}_c^A = \underset{\beta_c}{\text{argmin}} \sum_{i \in \Omega_c} \left\| x_i^A - \beta_c \begin{bmatrix} 1 \\ f_i^B - f_c^B \end{bmatrix}^T \right\|^2 \exp\left( \frac{-\|y_i^B - y_c^B\|^2}{2\kappa + \epsilon} \right) \quad \text{(Equation 7)}$$

Here, $$\underset{\beta_c}{\text{argmin}}$$

$(\cdot)$ refers to $\beta_c$ that minimizes $(\cdot)$.

The second modified biased image $$\hat{y}_i^B$$

may be obtained by applying Equations 6 and 7.

The alpha blender 405 performs alpha blending by applying the first modified biased image $$\hat{y}_i^A,$$

second modified biased image $$\hat{y}_i^B$$

and the alpha value output from the artificial neural network model 404 to Equation 8 below, and combines the two modified biased images. The alpha value may be trained and inferred through supervised learning in the artificial neural network model 404.

The derivation equation of the alpha blended biased image Y* is shown in Equation 8.

$$\hat{y}_i^* = \alpha_i \hat{y}_i^A + (1 - \alpha_i) \hat{y}_i^B \quad \text{(Equation 8)}$$

Here, a, is the alpha value of pixel i output from the artificial neural network model 304, and is a value between 0 and 1, and the first modified biased image $$\hat{y}_i^A$$

and the second modified biased image $$\hat{y}_i^B$$

may be obtained using Equations 6 and 7.

The variance estimator 305 of the present disclosure may obtain the estimate $$\hat{\sigma}_c^2$$

of the variance $\sigma_c^2$ by locally weighting the average of the sample variance of the unbiased image block as shown in Equation 4, and to this end, the sample variance of the unbiased image is provided to the variance estimator 406 from the sample variance buffer 403.

$$\hat{\sigma}_c^2 = \frac{1}{\sum_{i \in \Omega_c} \omega_i^\sigma} \sum_{i \in \Omega_c} \omega_i^\sigma s_i^2 \quad \text{(Equation 4)}$$

Here, $\omega_i^\sigma$ is the positive variance weight assigned to the it h sample variance $s_i^2$ belonging to the image block $\Omega_c$ of combination pixel c, and the variance weight $\omega_i^\sigma$ per pixel of the image block $\Omega_c$ may be trained and inferred through supervised learning in the artificial neural network model 304.

The James-Stein combiner 407 locally combines the image block of the biased image Y* alpha blended by Equation 8 and the image block of the unbiased image X supplied from the unbiased image buffer by applying Equation 9.

$$\delta(X_c, Y_c^*) = Y_c^* + \left(1 - \frac{(p-2)\delta c^2}{\|Xc - Y_c^*\|^2}\right)(Xc - Y_c^*) \quad \text{(Equation 9)}$$

The James-Stein combination equation $\delta(X_c, Y_c^*)$ of Equation 9 may generate an estimate $\hat{\Theta}_c$ of an unknown ground truth image block $\Theta_c$.

For an image block $\Omega_i$ of any pixel i, the combined image generator 408 averages the resulting values of the James-Stein combination equation of Equation 9 derived for all pixels c belonging to the image block and estimates it as a color value of the pixel i, which is expressed as Equation 10.

$$\hat{\theta}_i = \frac{1}{|\Omega_i|} \sum_{c \in \Omega_i} \delta_i(X_c, Y_c^*) \quad \text{(Equation 10)}$$

Here, $\hat{\theta}_i$ is an estimate of the color value of pixel i, $\Omega i$ is an image block centered on pixel i, and $\delta_i(X_c, Y_c^*)$ is the resulting value of the James-Stein combination equation of Equation 9 of the pixel c belonging to the image block $\Omega_i$.

In the first and second example embodiments, the artificial neural network models 304, 404 may be implemented as fully convolutional networks (U-Nets) providing a U-shaped architecture composed of a contraction path and an expansion path. U-Net has the form of an encoder and a decoder, and uses skip connection. The encoder may consist of 3×3 convolution, rectified linear Unit (ReLU), maxpooling, and the like, and the decoder may consist of upsampling, 3×3 convolution, rectified linear unit (ReLU), and the like.

FIG. 5 is an operational flowchart illustrating a method of improving image quality using a James-Stein combiner according to a first example embodiment of the present disclosure. The method of improving image quality using the James-Stein combiner of the present disclosure can be implemented by a processor in a conventional computer system.

The computer system determines the sample variance of the unbiased image block and the unbiased image block centered on the combination pixel c in the unbiased image (S501). The computer system determines the biased image block centered on the combination pixel c in the biased image obtained by removing noise from the unbiased image (S502).

The artificial neural network model of the computer system learns the biased image block, the unbiased image block, and the sample variance to derive the variance weight per pixel (S503).

The computer system calculates the variance estimate locally weighting the average of the sample variance of the unbiased image block by applying the variance weight per pixel to Equation 4 (S504).

The computer system combines the biased image block, the unbiased image block, and the variance estimate of the unbiased image block by applying the James-Stein combination equation of Equation 3 (S505).

The computer system outputs the combined image by applying the resulting value of the James-Stein combination equation to Equation 5 (S506).

Here, the unbiased image may be a rendering image by the path tracing method, in particular, a rendering image by the Monte Carlo path tracing method. The biased image is a rendering image in which noise is removed from the unbiased image based on learning, and it may be an image in which noise is removed from the unbiased image by the KPCN method described in Non-Patent Document 1 or an image in which noise is removed by the AFGSA method described in Non-Patent Document 2.

In the present disclosure, for the unbiased image and the biased image, each image block centered on the same combination pixel c is extracted (local homogeneous distribution assumption), and the extracted local image blocks are combined by applying the James-Stein combination equation.

FIG. 6 is an operational flowchart illustrating a method of improving image quality using a James-Stein combiner according to a second example embodiment of the present disclosure. The method of improving image quality using the James-Stein combiner of the present disclosure can be implemented by a processor in a conventional computer system.

The computer system determines the sample variance of the unbiased image block and the unbiased image block centered on the combination pixel c in the unbiased image (S601).

The computer system determines the first modified biased image block and the second modified biased image block centered on the combination pixel c in the first modified biased image and the second modified biased image modified to remove noise from the first unbiased image and the second unbiased image mutually independent and to include image feature information, respectively (S602).

The artificial neural network model of the computer system learns the first modified biased image block, the second modified biased image block, the unbiased image block, and the sample variance to derive the alpha value of the combination pixel c and the variance weight per pixel (S603).

The computer system combines the first modified biased image and the second modified biased image by applying the first modified biased image, the second modified biased image and the alpha value output from the artificial neural network model to Equation 8 and performing alpha blending, and derives the alpha blended biased image block (S604).

The computer system calculates the variance estimate of the unbiased image block by locally weighting the average of the sample variance of the unbiased image block by applying the variance weight per pixel output from the artificial neural network model to Equation 4 (S605).

The computer system locally combines the alpha blended biased image block, the unbiased image block, and the variance estimate of the unbiased image block by applying the James-Stein combination equation of Equation 9 (S606).

The computer system outputs the combined image by applying the resulting value of the James-Stein combination equation to Equation 10 (S607).

Figure 7:
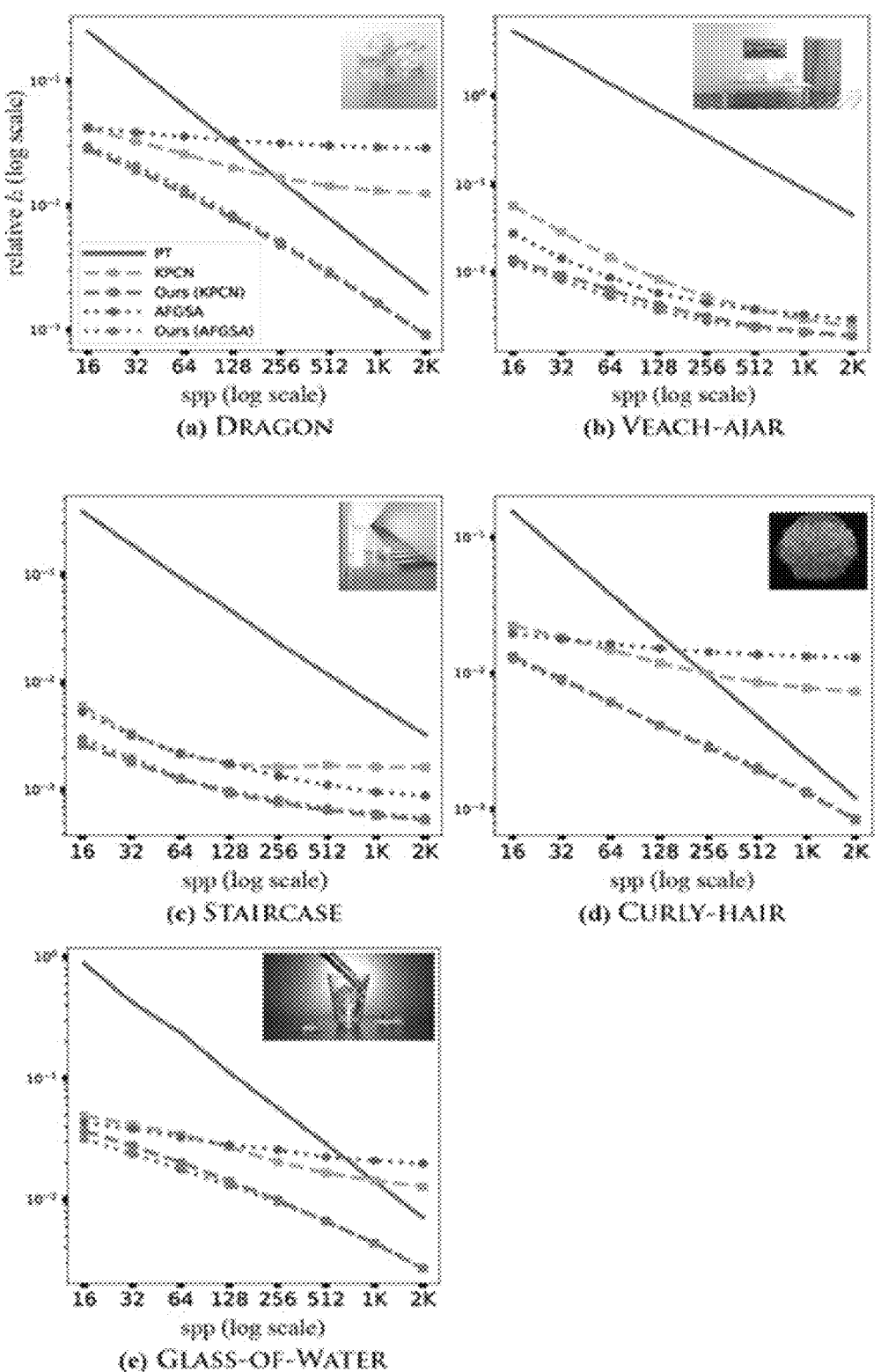
FIG. 7 is a graph comparing noise removal effects according to samples per pixel (spp) number of an image improving technology of the present disclosure and a conventional noise removal technology, wherein (a) is a graph for a dragon image, (b) is a graph for a veach-ajar image, (c) is a graph for a staircase image, (d) is a graph for a curly-hair image, and (e) is a graph for a glass-of-water image.

FIG. 7 is a graph comparing noise removal effects according to samples per pixel (spp) number of an image improving technology of the present disclosure and a conventional noise removal technology, wherein (a) is a graph for a dragon image, (b) is a graph for a veach-ajar image, (c) is a graph for a staircase image, (d) is a graph for a curly-hair image, and (e) is a graph for a glass-of-water image.

For each image, the result (PT) of removing noise by the PT method, the result (KPCN) of removing noise by applying the KPCN method based on Non-Patent Document 1, the result (AFGSA) of removing noise by applying the AFGSA method based on Non-Patent Document 2, the result (Ours (KPCN)) of applying the James-Stein combination of the present disclosure to the result of applying the KPCN method, and the result (Ours(AFGSA)) of applying the James-Stein combination of the present disclosure to the result of applying the AFGSA method is shown. Each graph shows the relative error (relative L2 error) comparing the result of each noise removing method and the ground truth image according to the number of samples per pixel (spp).

In all images, the results of the present disclosure (Ours (KPCN) and Ours(AFGSA)) have a reduced relative error compared to the results obtained by applying the PT method, KPCN method, and AFGSA method, and show consistency that as the number of samples per pixel (spp) increases, the error decreases.

All of the methods and processes described above may be implemented as software code modules executed by one or more general-purpose computers or processors and may be fully automated. The code modules may be stored on any type of computer-readable storage medium or other computer storage device. Some or all of the methods may be implemented with special computer hardware.

It should be understood that any routine description, element, or block of the flowchart described herein and/or shown in the accompanying drawing potentially represents a code, module, segment, or section including one or more executable instructions for implementing a particular logical function or element. Alternative examples are included within the scope of the examples described herein, and elements or functions may be deleted or executed in order from those shown or discussed, substantially synchronously or in reverse order, depending on the functionality to be understood herein.

Many variations and modifications may be made to the above-described example embodiments, and any of their elements should be understood as one of other acceptable examples. All such variations and modifications are intended to be included within the scope of this disclosure and protected by the appended claims. The example embodiments according to the present disclosure described above may be implemented in the form of program instructions that can be executed through various computer components and recorded on a non-transitory computer-readable recording medium. A computer-readable recording medium may include program instructions, data files, data structures, and the like, alone or in combination. Program instructions recorded on a non-transitory computer-readable recording medium may be designed and configured specifically for the present disclosure or may be known and available to a person skilled in the computer software art. Examples of non-transitory computer-readable recording media include magnetic media such as hard disks, floppy disks, and magnetic tapes, optical recording media such as CD-ROMs and DVDs, magneto-optical media such as floptical disks, and hardware devices specifically configured to store and execute program instructions such as ROM, RAM, flash memory, and the like. Examples of program instructions include machine code such as those generated by compilers, as well as high-level language code that can be executed by a computer using an interpreter. The hardware device may be configured to operate as one or more software modules to perform processing according to the present disclosure, and vice versa.

Although the present disclosure has been described above, by specific matters such as specific components and limited example embodiments and drawings, they are provided only to facilitate a more general understanding of the present disclosure, and the present disclosure is not limited to the above example embodiments, and a person skilled in the art to which the present disclosure pertains can make various variations and modifications from these descriptions.

Therefore, the idea of the present disclosure should not be limited to the example embodiments described above, and not only the appended claims, but also all modifications equivalent to these claims or their equivalents fall within the scope of the spirit of the present disclosure.

EXPLANATION OF REFERENCE NUMERALS 301, 401; Unbiased image buffer
302, 402; Biased image buffer
304, 403; Sample variance buffer
304, 404; Artificial neural network model
405; Alpha blender
305, 406; Variance estimator
306, 407; James-Stein combiner
307, 408; Combined image generator

What is claimed is:

1. An apparatus for improving image quality using a James-Stein combination equation, the apparatus comprising:
    a processor; and
    a memory storing instructions that, when executed by the processor, cause the processor to:
    output an unbiased image block centered on combination pixel c in an unbiased image;

output a biased image block centered on combination pixel c in a biased image obtained by removing noise from the unbiased image;
    output a sample variance of the unbiased image;
    derive a variance weight per pixel by learning the biased image block, the unbiased image block, and the sample variance using an artificial neural network model;
    output a variance estimate of the unbiased image block based on the variance weight per pixel; and
    locally combine the biased image block, the unbiased image block, and the variance estimate of the unbiased image block by applying the James-Stein combination equation,
    wherein an error of an image combined by applying the James-Stein combination equation is smaller than an error of the unbiased image.

2. The apparatus of claim 1, wherein the instructions further cause the processor to:
    output a combined image based on a resulting value of the James-Stein combination equation.

3. The apparatus of claim 2, wherein the instructions further cause the processor to:
    average resulting values of the James-Stein combination equation derived for all pixels c belonging to an image block $\Omega_i$ of any pixel i to estimate it as a color value of the pixel i.

4. The apparatus of claim 1, wherein the unbiased image is a rendering image by a path tracing method.

5. The apparatus of claim 1, wherein the biased image is an image obtained by removing noise from the unbiased image by at least one of a kernel predicting convolution network (KPCN) method and an auxiliary feature guided self-attention (AFGSA) method.

6. The apparatus of claim 1, wherein the artificial neural network model is implemented as U-Net.

7. An apparatus for improving image quality using a James-Stein combination equation the apparatus comprising:
    a processor; and
    a memory storing instructions that, when executed by the processor, cause the processor to:
    output an unbiased image block centered on combination pixel c in an unbiased image;
    output a first modified biased image block and a second modified biased image block centered on combination pixel c, respectively, in a first modified biased image and a second modified biased image modified to remove noise from two mutually independent unbiased images and to include image feature information, respectively;
    output a sample variance of the unbiased image;
    derive an alpha value and a variance weight per pixel by learning the first modified biased image block, the second modified biased image block, the unbiased image block, and the sample variance using an artificial neural network model;
    output a variance estimate of the unbiased image block based on the variance weight per pixel;
    derive an alpha blended biased image block in which the first modified biased image block and the second modified biased image block are combined by performing alpha blending based on the first modified biased image block, the second modified biased image block, and the alpha value; and locally combine the alpha blended biased image block, the unbiased image block, and the variance estimate of the unbiased image block by applying the James-Stein combination equation, wherein an error of an image combined by applying the James-Stein combination equation is smaller than an error of the unbiased image.

8. The apparatus of claim 7, wherein the instructions further cause the processor to:

perform alpha blending by applying the first modified biased image block $$(\hat{y}_i^A),$$

the second modified biased image block $$(\hat{y}_i^B),$$

and the alpha value ($\alpha_i$) to Equation 8 below:

$$\hat{y}_i^* = \alpha_i \hat{y}_i^A + (1 - \alpha_i)\hat{y}_i^B \qquad \text{(Equation 8)}$$

where $\alpha_i$ is an alpha value of pixel i output from the artificial neural network model, and is a value between 0 and 1.

9. The apparatus of claim 8, wherein the first modified biased image is derived by reflecting image features derived as a second feature set to the first biased image, and the second modified biased image is derived by reflecting image features derived as a first feature set to the second biased image, and the first feature set includes rendering-related image features of the first biased image, and the second feature set includes rendering-related image features of the second biased image.

10. The apparatus of claim 7, wherein, of the two mutually independent unbiased images, one unbiased image includes an average of the first half samples, and the other unbiased image includes an average of the second half samples.

11. The apparatus of claim 7, wherein the instructions further cause the processor to:

output a combined image based on a resulting value of the James-Stein combination equation.

12. The apparatus of claim 11, wherein the instructions further cause the processor to:

average resulting values of the James-Stein combination equation derived for all pixels c belonging to an image block $\Omega_i$ of any pixel i to estimate it as a color value of the pixel i.

13. The apparatus of claim 7, wherein the unbiased image is a rendering image by a path tracing method.

14. The apparatus of claim 7, wherein the biased image is an image obtained by removing noise from the unbiased image by at least one of a kernel predicting convolution network (KPCN) method and an auxiliary feature guided self-attention (AFGSA) method.

15. The apparatus of claim 7, wherein the artificial neural network model is implemented as U-Net.

16. A method of improving image quality using a James-Stein combination equation implemented by at least one processor of a computer system, the method comprising:

determining, by the computer system, an unbiased image block centered on combination pixel c in an unbiased image and a sample variance of the unbiased image block;

determining, by the computer system, a biased image block centered on combination pixel c in a biased image obtained by removing noise from the unbiased image;

deriving, by the computer system, a variance weight per pixel by learning the biased image block, the unbiased image block, and the sample variance in an artificial neural network model;

calculating, by the computer system, a variance estimate of the unbiased image block based on the variance weight per pixel;

locally combining, by the computer system, the biased image block, the unbiased image block, and the variance estimate of the unbiased image block by applying the James-Stein combination equation; and outputting, by the computer system, a combined image based on a resulting value of the James-Stein combination equation, wherein an error of an image combined by the James-Stein combination equation is smaller than an error of the unbiased image.

17. The method of claim 16, wherein the outputting of the combined image based on the resulting value of the James-Stein combination equation by the computer system comprises averaging resulting values of the James-Stein combination equation derived for all pixels c belonging to an image block $\Omega_i$ of any pixel i to estimate it as a color value of the pixel i.

18. The method of claim 16, wherein the unbiased image is a rendering image by a path tracing method.

19. The method of claim 16, wherein the biased image is an image obtained by removing noise from the unbiased image by at least one of a kernel predicting convolution network (KPCN) method and an auxiliary feature guided self-attention (AFGSA) method.

20. The method of claim 16, wherein the artificial neural network model is implemented as U-Net.

* * * * *